(12) United States Patent
Maurer et al.

(10) Patent No.: US 6,329,895 B1
(45) Date of Patent: *Dec. 11, 2001

(54) RELEASING MAGNET FOR ANTI-THEFT DEVICES FOR SALES GOODS

(75) Inventors: Albert Maurer, Lindenhofstrasse 14, CH-8624 Grüt; Heinz Hofstetter, Männedorf, both of (CH)

(73) Assignee: Albert Maurer, Grüt (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,376

(22) PCT Filed: Oct. 25, 1996

(86) PCT No.: PCT/CH96/00378

§ 371 Date: May 8, 1998

§ 102(e) Date: May 8, 1998

(87) PCT Pub. No.: WO97/18492

PCT Pub. Date: May 22, 1997

(30) Foreign Application Priority Data

Nov. 14, 1995 (CH) .................................................. 3226/95

(51) Int. Cl.$^7$ .................................. H01F 3/00; H01P 7/02
(52) U.S. Cl. .......................... 335/303; 335/285; 335/302; 340/572.9; 70/57.1
(58) Field of Search .................................... 335/302–306, 335/205–208, 285; 24/303, 704.1; 340/572.9; 70/57.1

(56) References Cited

U.S. PATENT DOCUMENTS

| | | | | |
|---|---|---|---|---|
| 3,163,596 | * | 12/1964 | Ferris et al. .......................... | 335/306 |
| 3,646,293 | * | 2/1972 | Howard ................................ | 200/84 C |
| 3,815,066 | * | 6/1974 | Vinal .................................... | 335/306 |
| 3,916,821 | | 11/1975 | Pies ..................................... | 116/114 R |
| 4,121,184 | * | 10/1978 | Dinkler et al. ........................ | 335/179 |
| 4,213,110 | * | 7/1980 | Holce ................................... | 335/207 |
| 4,339,853 | | 7/1982 | Lipschitz ........................... | 24/155 BR |
| 4,414,523 | | 11/1983 | Pieters ................................. | 335/302 |
| 4,527,310 | | 7/1985 | Vandebult .......................... | 24/150 R |
| 4,837,539 | * | 6/1989 | Baker ................................... | 335/207 |
| 5,425,763 | * | 6/1995 | Stemmann ............................ | 623/11 |
| 5,621,393 | * | 4/1997 | Urich ................................... | 340/616 |

FOREIGN PATENT DOCUMENTS 9409235   4/1994   (WO).

* cited by examiner

*Primary Examiner*—Ramon M Barrera
(74) *Attorney, Agent, or Firm*—Pauley Petersen Kinne & Fejer

(57) ABSTRACT

A releasing magnet for anti-theft devices for sales goods with a permanent magnet and a housing having a disc-shaped collar and a fastener for securing the housing to a table. The housing is made of plastic and at least almost surrounds the permanent magnet which prevents corrosion and allows the releasing magnet to be washed so that its use is hygienic.

6 Claims, 1 Drawing Sheet

RELEASING MAGNET FOR ANTI-THEFT DEVICES FOR SALES GOODS

BACKGROUND OF THE INVENTION

1. Field of the Invention

This invention relates to a release magnet for anti-theft devices for merchandise.

2. Description of Prior Art

Anti-theft devices, which are pushed through the articles to be secured, are known in commerce, in particular for merchandise, such as textiles, handbags, and the like. When the anti-theft devices are removed without authorization, they damage or at least partially destroy the articles. For example, conventional anti-theft devices consist of a two-piece security body, fastened on clothing when pushed through the clothing. These two parts can only be released if one of the parts, which has automatically clamping locking means, is placed for release into a cup-shaped opening of a magnet. The locking means are thus magnetically actuated, the clamping is released and the two parts can be separated and removed from the material without damaging the material. The release magnets have a housing consisting of a disk-shaped collar which is screwed together with a cylinder. The actual release magnet, a permanent magnet, is clamped in the cylinder and secured from below by means of a plate screwed into the cylinder. All these elements are made of steel. At a top, the release magnet is secured by a press-fitted U-shaped cover made of a light metal or brass. These release magnets are inserted into a through-bore in a table and screwed in from the bottom in such a way that only the collar projects past the surface of the table and rests with an underside on the table top, without a space in between.

These release magnets are very expensive, since they have several screwed together parts. For exactly this reason they have no homogeneous surface. The release magnets are difficult to clean and have a tendency to corrode. The magnet is particularly prone to corrosion, since humidity and cleaning agents can penetrate between the cover of light metal or brass and the steel cylinder. Release magnets wherein the releasable security elements meet the magnet directly and come into contact with the magnet are also widely known. This often results in damage, and the highly corrosion-prone magnets are directly exposed to damaging effects from the outside.

SUMMARY OF THE INVENTION

It is one object of this invention to create a release magnet of the type mentioned which has fewer parts and is therefore cheaper and also is so easy to clean that sanitary conditions are assured and miscellaneous corrosion is prevented to a great degree.

This object is attained by this invention as described in the following specification and in the claims.

BRIEF DESCRIPTION OF THE DRAWINGS

The release magnet for anti-theft devices in accordance with this invention will be described in what follows in connection with the drawings wherein.

DESCRIPTION OF PREFERRED EMBODIMENTS

Figure 1:
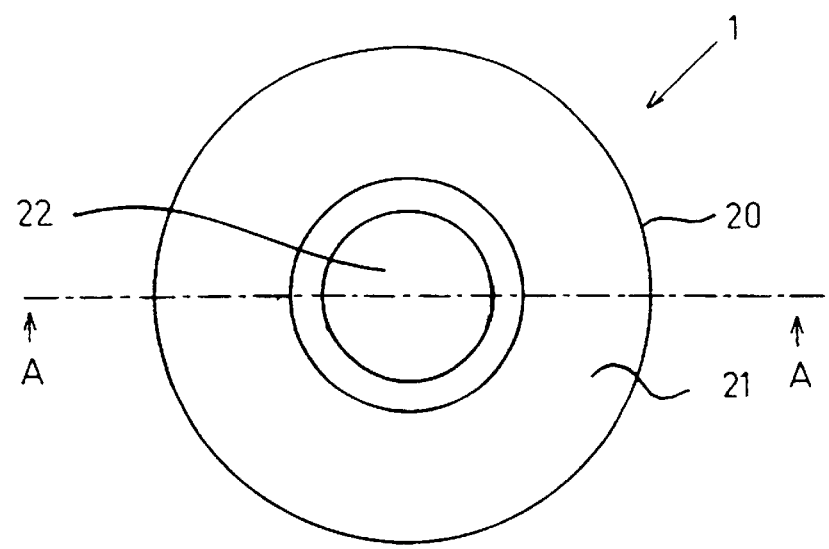
FIG. 1 is a top view of a release magnet.

Only the housing 20 of the release magnet 1 can be seen in the top view of FIG. 1. The housing 20 has a round collar 21 and a round depression 22 concentrically cut in the housing 20. The depression 22 corresponds in size to the elements of conventional magnetically releasable anti-theft devices. For releasing such an anti-theft device, it is known to extend the part of the anti-theft device to be released into the depression 22, whereupon the locking pin on the upper part of the anti-theft device can be pulled out of the released part.

Figure 2:
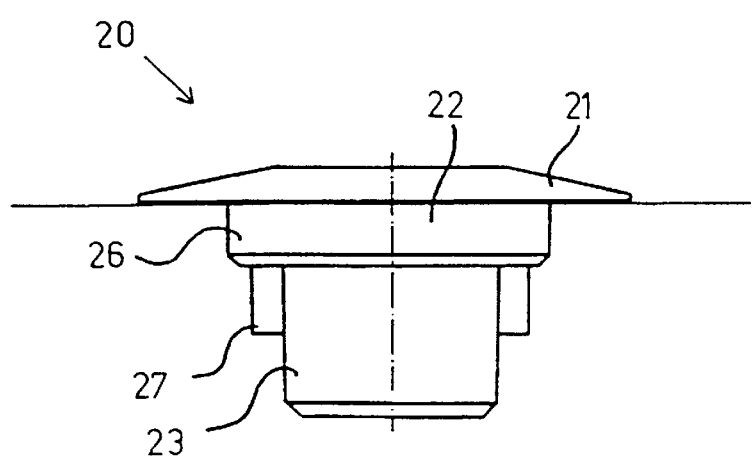
FIG. 2 is a side view of the release magnet.

The housing 20 is represented in the side view of FIG. 2. The housing 20 has the collar 21 which, in the state where it is mounted on a table, rests on the table at an underside, wherein the other parts are inside the table itself and are not easily accessible. A first cylindrical holder 26 adjoins the underside of the collar 21 and receives a magnetic force amplifying ring 11. The underside of the first holder 26 is adjoined by a second cylindrical holder 23. The cylindrical holder 23 encloses the permanent magnet 10. Fastening means 27 are arranged laterally next to the second holder 23 and contact the second holder 23 and the first holder 26. The fastening means 27 are used for fastening the release magnet on a table or the like. The fastening means 27 can be designed as dowel-like receivers for screws. However, many other types of the fastening means 27 are conceivable for fastening the release magnet in a table.

Figure 3:
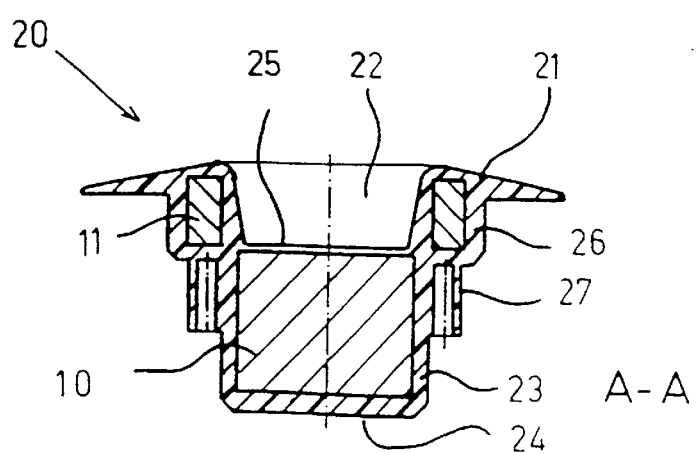
FIG. 3 is a vertical cross sectional view of the release magnet.

FIG. 3 represents the release magnet in cross section A—A as shown in FIG. 1, in a vertical direction. The housing 20 is of one piece and encloses both the permanent magnet 10 and the magnetic force amplifying ring 11 completely and free of gaps. The permanent magnet 10 is located in the second holder 23 and is downwardly covered by a bottom 24. Toward the top the permanent magnet 10 is also seamlessly covered by a cover 25. The cover 25 is a bottom for the depression 22, which is used for receiving corresponding parts of anti-theft devices. The first holder 26 completely surrounds the magnetic force amplifying ring 11. At an upper end the first holder 26 makes a direct transition into the collar 21. On its sides, the depression 22 has slightly inwardly inclined flanks, which simultaneously form an inner part of the first holder 26. In this example the fastening elements are designed as lateral projections on the second holder 23 and have vertical bores for receiving screws.

The magnetic force amplifying ring 11 is arranged in the housing 20 above and approximately centered with respect to the permanent magnet 10. The poles of the magnetic force amplifying ring 11 and of the permanent magnet 10 are arranged in such a way that like poles are located directly opposite each other and adjoining.

The manufacture of the release magnet in accordance with this invention preferably takes place by means of a direct, single piece extrusion coating of the permanent magnet 10 and the magnetic force amplifying ring 11, in a single work step. The magnetic force amplifying ring 11 is at a slight distance from the permanent magnet 10. Both the permanent magnet 10 and the magnetic force amplifying ring 11 are almost completely enclosed in the material of the housing 20. This gives further stability to the housing 20 and prevents all undesired direct contact with the magnetic materials. Small exhaust holes can be provided to accommodate the extrusion process, can be arranged in the bottom 24 and can subsequently be closed. It is easily seen that the release magnet in accordance with this invention has no gaps, no threads, or the like. For this reason neither humidity nor cleaning agents can reach either the magnetic force amplifying ring 11 or the permanent magnet 10 which are protected against soiling and corrosion. The plastic housing can be washed. As a flat disk which runs out towards the outside, the collar 21 cannot be grasped by pliers or other tools. It is also not possible to remove the permanent magnet by unscrewing the inner part. Deliberate damage is practically impossible. The release magnets in accordance with this invention can also be embodied with the housing 20 in such a way that they can be erected on a table, screwed or glued on from above or below. Thus the collar 21 can also be formed on the lower end of the release magnet and can have the fastening elements.

What is claimed is:

1. A releasing magnet assembly for anti-theft devices for sales goods, comprising:

a. a first tubular portion having a bottom end and a top end and closed at the bottom end thereof and having a first bore, the first bore having a permanent magnet therein;

b. a second tubular portion having a bottom end and a top end and concentric with the first tubular portion, and closed at its bottom end and having a second bore sized for receiving an operative portion of the anti-theft devices, the closed bottom end of the second tubular portion abutting the first tubular portion top end thereby enclosing the bore of the first tubular portion and sealing the magnet therein from environmental fluids;

c. a collar at said second tubular portion top end for aiding in mounting the releasing magnet assembly, the collar shaped to make difficult the grasting of the assembly when in the mounted condition;

d. wherein the collar is a conical shape with the large end of the cone abutting the top end of the second tubular portion; and e. first and second tubular attachments attached to the first tubular portion with bores therein for receiving of screws.

2. The releasing magnet assembly for anti-theft devices for sales goods of claim 1, wherein the collar is a flattened conical shape.

3. The releasing magnet assembly for anti-theft devices for sales goods of claim 1 wherein the second bore has an inwardly sloping wall from top end to bottom end.

4. The releasing magnet assembly for anti-theft devices for sales goods of claim 1 wherein the permanent magnet is encased in the first tubular portion completely filling the first bore.

5. A releasing magnet assembly for anti-theft devices for sales goods comprising:

a. a first tubular portion having a bottom end and a top end and closed at the bottom end thereof and having a first bore, the first bore having a permanent magnet therein;

b. a second tubular portion having a bottom end and a top end and concentric with the first tubular portion, and closed at its bottom end and having a second bore sized for receiving an operative portion of the anti-theft devices, the closed bottom end of the second tubular portion abutting the first tubular portion top end thereby enclosing the bore of the first tubular portion and sealing the magnet therein from environmental fluids; and c. a magnetic shunt entirely encapsulated within the wall of the second tubular portion and positioned to transfer flux from the permanent magnet to the second tubular portion surrounding the second central bore.

6. The release magnet of claim 5, wherein the second tubular portion has a greater outside diameter than the first tubular portion.

* * * * *